(12) United States Patent
Okazaki et al.

(10) Patent No.: US 10,406,600 B2
(45) Date of Patent: Sep. 10, 2019

(54) LAMINATE MOLDING DEVICE

(71) Applicant: Sodick Co., Ltd., Kanagawa (JP)

(72) Inventors: Shuji Okazaki, Kanagawa (JP); Katsutaka Muranaka, Kanagawa (JP)

(73) Assignee: Sodick Co., Lyd., Kanagawa (JP)

( * ) Notice: Subject to any disclaimer, the term of this patent is extended or adjusted under 35 U.S.C. 154(b) by 21 days.

(21) Appl. No.: 15/942,446

(22) Filed: Mar. 31, 2018

(65) Prior Publication Data
US 2018/0290210 A1  Oct. 11, 2018

(30) Foreign Application Priority Data

Apr. 9, 2017 (JP) .................................. 2017-077205

(51) Int. Cl.
| | | |
|---|---|---|
| *B29C 67/00* | (2017.01) | |
| *B22F 3/105* | (2006.01) | |
| *B33Y 30/00* | (2015.01) | |

(52) U.S. Cl.
CPC ............ *B22F 3/1055* (2013.01); *B33Y 30/00* (2014.12); *B22F 2003/1056* (2013.01); *Y02P 10/295* (2015.11)

(58) Field of Classification Search
CPC ......... B29C 64/00; B29C 64/20; B29C 64/25; B29C 64/255; B29C 64/295; B29C 64/364; B33Y 40/00
See application file for complete search history.

(56) References Cited

U.S. PATENT DOCUMENTS

| | | | | |
|---|---|---|---|---|
| 6,071,457 A | * | 6/2000 | Bednarz | B29B 11/14 425/129.1 |
| 6,969,244 B2 | * | 11/2005 | Kuniyoshi | B22F 3/004 425/143 |
| 9,486,961 B2 | * | 11/2016 | Okazaki | B33Y 30/00 |
| 2011/0256253 A1 | | 10/2011 | Amaya et al. | |

FOREIGN PATENT DOCUMENTS

JP          4566286          10/2010

* cited by examiner

*Primary Examiner* — Joseph S Del Sole
*Assistant Examiner* — Thu Khanh T Nguyen
(74) *Attorney, Agent, or Firm* — JCIPRNET (57) ABSTRACT

A heat source isolation mechanism of the laminate molding device includes an intermediate table that is mounted on an upper surface of a main table, an auxiliary table which is provided on an upper surface of the intermediate table and of which a temperature can be adjusted, and a bellows member in which the auxiliary table is disposed and which includes a lower end that is provided on the intermediate table and an upper end that is mounted on the peripheral wall, and which expands as the main table is lowered. The bellows member is made of an insulating material. The recoater head supplies a metal material powder to a molding area inside the bellows member and a powder layer is formed on the auxiliary table, a laser emission unit emits a laser beam to a predetermined area of the powder layer and sintering is performed.

5 Claims, 5 Drawing Sheets

LAMINATE MOLDING DEVICE

CROSS-REFERENCE TO RELATED APPLICATIONS

This application claims the priority benefit of Japanese application serial no. 2017-077205, filed on Apr. 9, 2017. The entirety of the above-mentioned patent application is hereby incorporated by reference herein and made a part of this specification.

BACKGROUND

Technical Field

The present disclosure relates to a laminate molding device configured to mold a metal laminate molded object.

Description of Related Art

As a device for producing a metal laminate molded object, there is a laminate molding device described in Patent Document 1. In this laminate molding device, immediately above a molding table in a molding tank, a recoater head is moved in a horizontal uniaxial direction, a metal material powder is supplied and flattened by a material accommodation unit and a blade provided on the recoater head to form a powder layer, and a laser beam is emitted to an emission area of the powder layer by a laser emission unit to form a sintered layer. Then, a new powder layer is formed on the sintered layer and a laser beam is emitted to form a sintered layer, and these processes are repeated to mold a metal laminate molded object.

Here, in order to obtain a sintered layer having a desired hardness and density, it is necessary to preheat material powder placed on the emission area of the powder layer to about 120 degrees and then perform sintering. Therefore, a molding table on which the material powder is placed is maintained in a heated state at the above temperature range in order to transfer heat to a molded object during molding and material powder placed on a laser emission area of the next powder layer.

However, when the molding table is heated in this manner, heat is transferred to not only the molded object during molding and the material powder placed on the laser emission area of the next powder layer but also a drive mechanism for lowering the molding table and a peripheral member adjacent to the molding table. Accordingly, thermal deformation occurs in the drive mechanism and the peripheral member, and molding accuracy decreases, and a deformed part may not return to its original shape even after returning to room temperature, and furthermore, problems such as a premature device failure may occur.

Thus, in the laminate molding device described in Patent Document 1, a base supporting a cooling pipe or a heating pipe is provided above the molding table, a substrate is mounted on the base, and a gap or an insulating material is provided between the base and the molding table. Accordingly, direct transfer of heat from the molding table to the drive mechanism and the peripheral member is prevented.

[Patent Document 1] Japanese Patent No. 4566286

However, generally, a time required for one molding is several tens of hours. Thus, heat emitted from the heated molding table is transferred to not only the molded object during molding and the material powder placed on the laser emission area of the next powder layer but also material powder placed outside thereof. In addition, the material powder supplied during molding spreads over the entire space inside the peripheral wall surrounding the molding table. Accordingly, due to heat transferred from the heated material powder, thermal deformation may occur in the peripheral wall and the peripheral member adjacent thereto.

Further, depending on properties of a selected material powder, preheating may be performed at a temperature higher than the above temperature range. When molding is performed at such a high temperature, the above-described thermal influences become more significant. Particularly, when a rubber or resin member provided in contact with the molding table, for example, a peripheral member such as a wiper which is provided between a peripheral wall and the molding table and prevents material powder from dropping down is exposed to a high temperature for a long time, the member may deteriorate such that it is deformed when it is cured before it can be restored to its original shape.

The disclosure has been made in view of the above circumstances and an object is to provide a laminate molding device capable of molding a molded object by preheating material powder at a high temperature while preventing thermal deformation of a drive mechanism, a peripheral wall, and a peripheral member.

SUMMARY

A laminate molding device according to a first disclosure includes a recoater head that reciprocates in a horizontal uniaxial direction, supplies and flattens a metal material powder, and forms a powder layer; a laser emission unit configured to emit a laser beam to an emission area of the powder layer to form a sintered layer; a main table; a peripheral wall that is provided to surround the main table; a space that is surrounded by the peripheral wall; a drive mechanism that is connected to the main table and increases a volume of the space by lowering the main table; and a heat source isolation mechanism that is disposed on the main table, wherein the heat source isolation mechanism includes an intermediate table that is mounted on an upper surface of the main table; an auxiliary table which is provided on an upper surface of the intermediate table and of which a temperature can be adjusted; and a bellows member in which the auxiliary table is disposed and which includes a lower end that is provided on the intermediate table and an upper end that is mounted on the peripheral wall, and which expands as the main table is lowered, wherein the bellows member is made of an insulating material, and wherein the recoater head supplies a metal material powder to a molding area inside the bellows member and a powder layer is formed on the auxiliary table, the laser emission unit emits a laser beam to a predetermined area of the powder layer and sintering is performed, and thus a molded object is molded.

DESCRIPTION OF THE EMBODIMENTS

Embodiments of the present disclosure will be described below with reference to the drawings.

Figure 1:
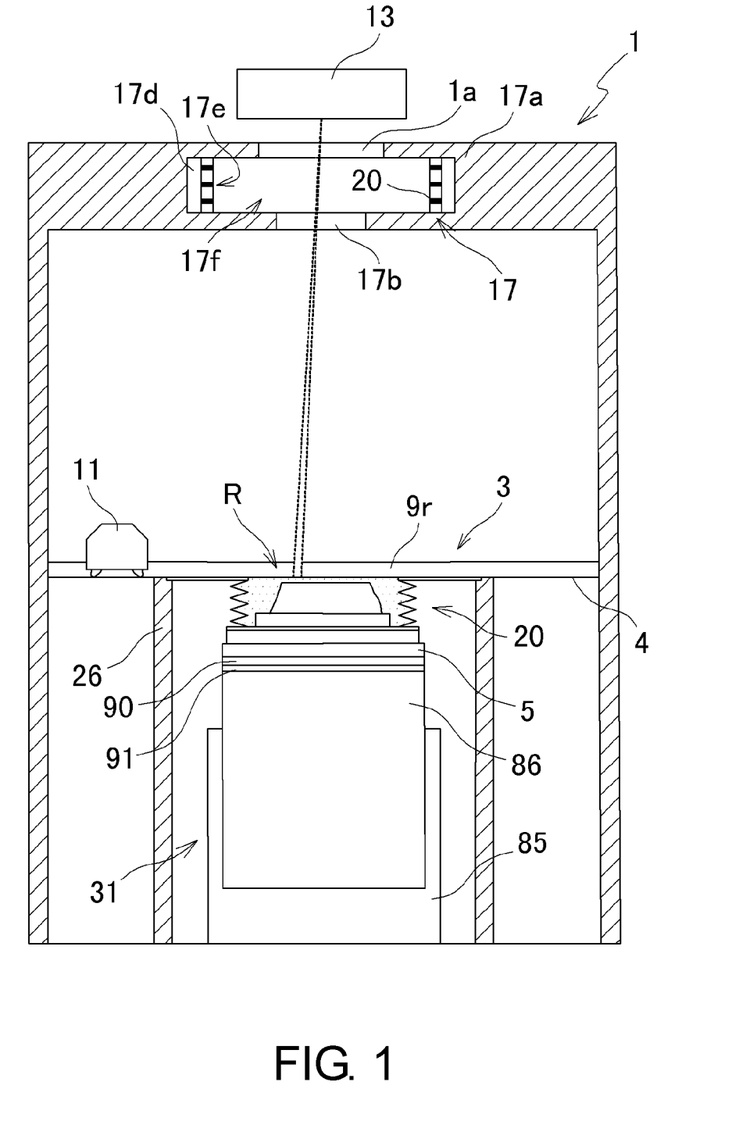
FIG. 1 is a front view of a laminate molding device according to an embodiment.

As shown in FIG. 1, a laminate molding device according to an embodiment of the present disclosure includes a molding tank 1 which covers a molding area R and into which an inert gas is filled to a predetermined concentration, a powder layer forming device 3 provided in the molding tank 1, and a laser emission unit 13 configured to emit a laser beam to a predetermined area of a powder layer and sinter material powder.

The powder layer forming device 3 includes a recoater head 11 that is movable in a horizontal uniaxial direction and elongated members 9r and 9l that are provided in a movement direction of the recoater head 11. In a space surrounded by a peripheral wall 26, a main table 5 that is movable in a vertical direction when driven by a drive mechanism 31 is provided.

Figure 2A:
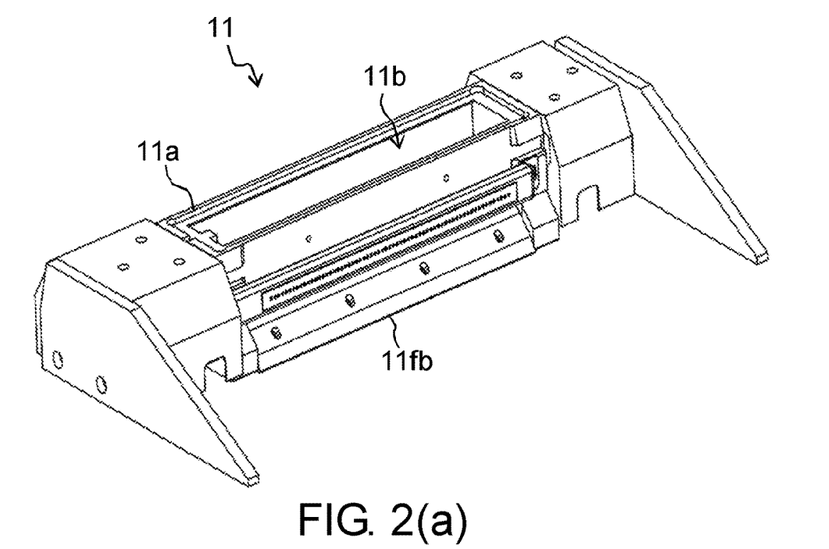
FIG. 2(a) and FIG. 2(b) are perspective views of a recoater head.
Figure 2B:
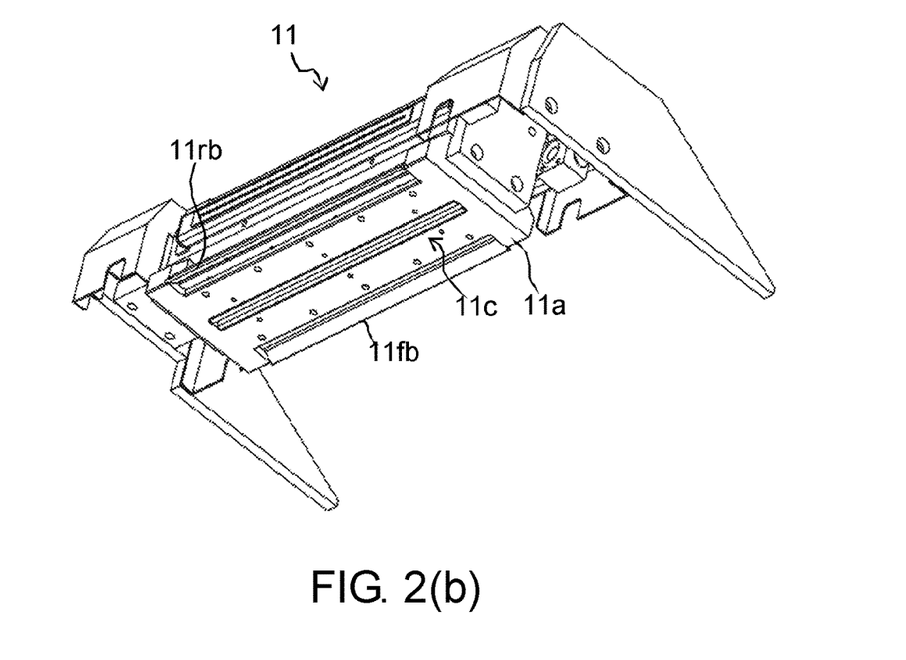

As shown in FIG. 2(a) and FIG. 2(b), the recoater head 11 includes a material accommodation unit 11a, an upper surface opening 11b provided on the upper surface of the material accommodation unit 11a, and a material discharge port 11c that is provided on the bottom surface of the material accommodation unit 11a and discharges material powder in the material accommodation unit 11a. The material discharge port 11c has a slit-like elongated shape that extends in the horizontal uniaxial direction orthogonal to the movement direction of the recoater head 11. On both side surfaces of the recoater head 11, blades 11fb and 11rb for flattening material powder discharged from the material discharge port 11c to form a powder layer are provided.

Figure 3:
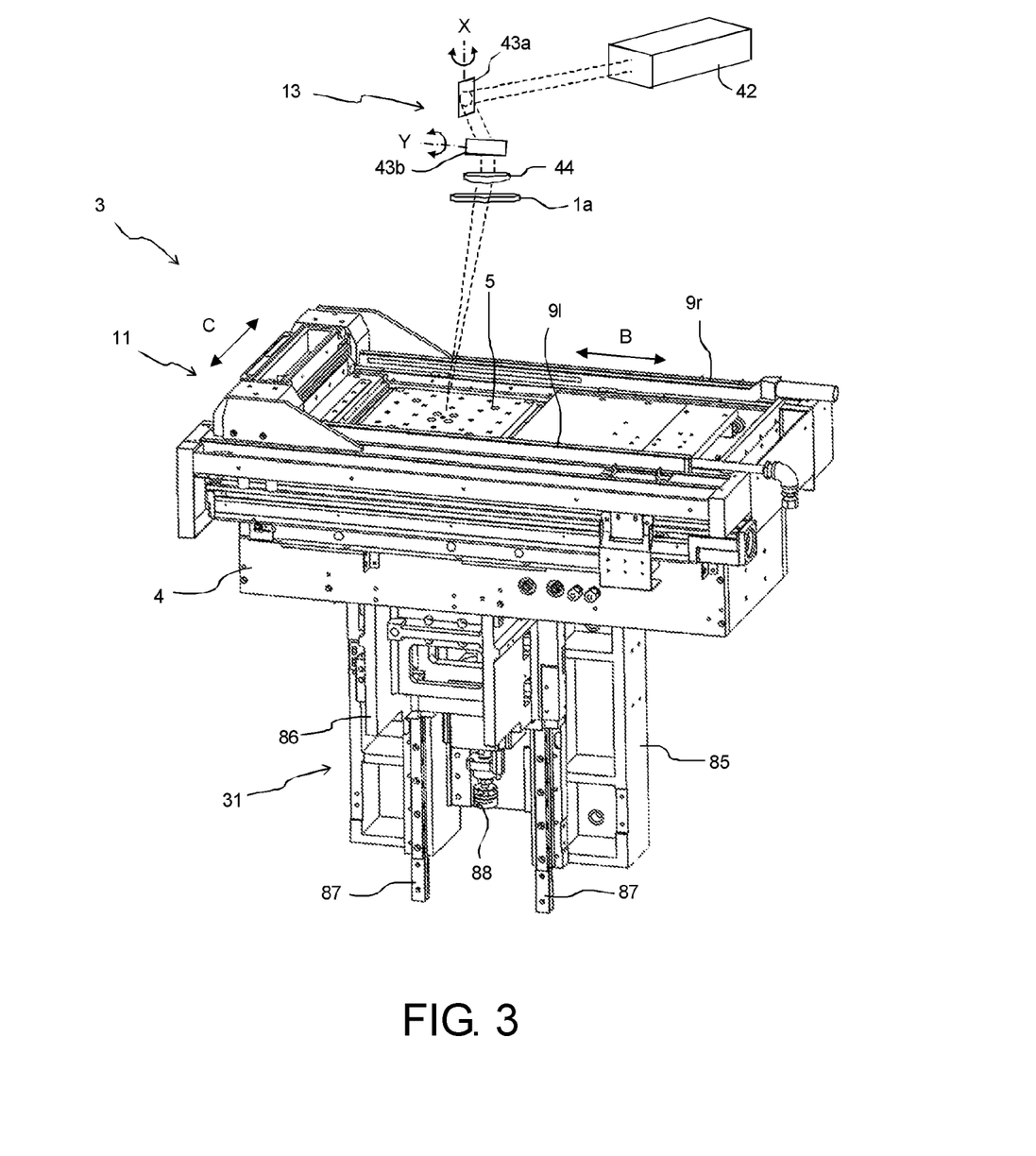
FIG. 3 is a perspective view of a powder layer forming device and a laser emission unit.

As shown in FIG. 3, openings are provided in the elongated members 9r and 9l in the movement direction of the recoater head 11. When one of these openings is used as an inert gas supply port and the other thereof is used as an inert gas discharge port, a flow of an inert gas is formed in the molding tank 1 and generated fumes are easily discharged according to the flow of the inert gas. Here, the inert gas is a gas that does not substantially react with material powder, and includes, for example, nitrogen gas, argon gas, and helium gas.

The laser emission unit 13 is provided above the molding tank 1. The laser emission unit 13 includes a laser source 42 configured to output a laser beam, a pair of galvano scanners 43a and 43b used for two-dimensionally scanning the laser beam output from the laser source 42, and a condenser lens 44 configured to condense the laser beam. The galvano scanner 43a scans a laser beam in an arrow B direction and the galvano scanner 43b scans a laser beam in an arrow C direction. In the galvano scanners 43a and 43b, when a rotation angle is controlled according to a magnitude of a rotation angle control signal and a magnitude of an input rotation angle control signal is changed, a laser emission position can be moved to a desired position. The condenser lens 44 is, for example, an fθ lens.

A laser beam that has passed through the condenser lens 44 passes through a window 1a provided in the molding tank 1 and is emitted to the powder layer. The type of the laser is not limited as long as it can sinter material powder, and, for example, a CO2 laser, a fiber laser, and a YAG laser may be used. The window 1a is made of a material through which a laser can pass. When the laser is a fiber laser or a YAG laser, the window 1a is made of, for example, quartz glass.

As shown in FIG. 1, in the molding tank 1, a fumes adhesion prevention unit 17 connected to the window 1a is provided. The adhesion prevention unit 17 includes a housing 17a and a cylindrical diffusion member 17c disposed in the housing 17a. An inert gas supply space 17d is provided between the housing 17a and the diffusion member 17c. In addition, on the bottom surface of the housing 17a, an opening 17b is provided inside the diffusion member 17c. A plurality of pores 17e are provided in the diffusion member 17c, and a clean inert gas supplied to the inert gas supply space 17d is filled into a clean space 17f through the pores 17e. Then, the clean inert gas filled into the clean space 17f is sprayed downward to the adhesion prevention unit 17 through the opening 17b.

As shown in FIG. 3, the drive mechanism 31 includes a guide base 85 and a slide base 86 that can be driven in the vertical direction with respect to the guide base 85 and is disposed below the main table 5. A slide mechanism 87 and a screw feed mechanism 88 are mounted on the guide base 85.

Figure 4:
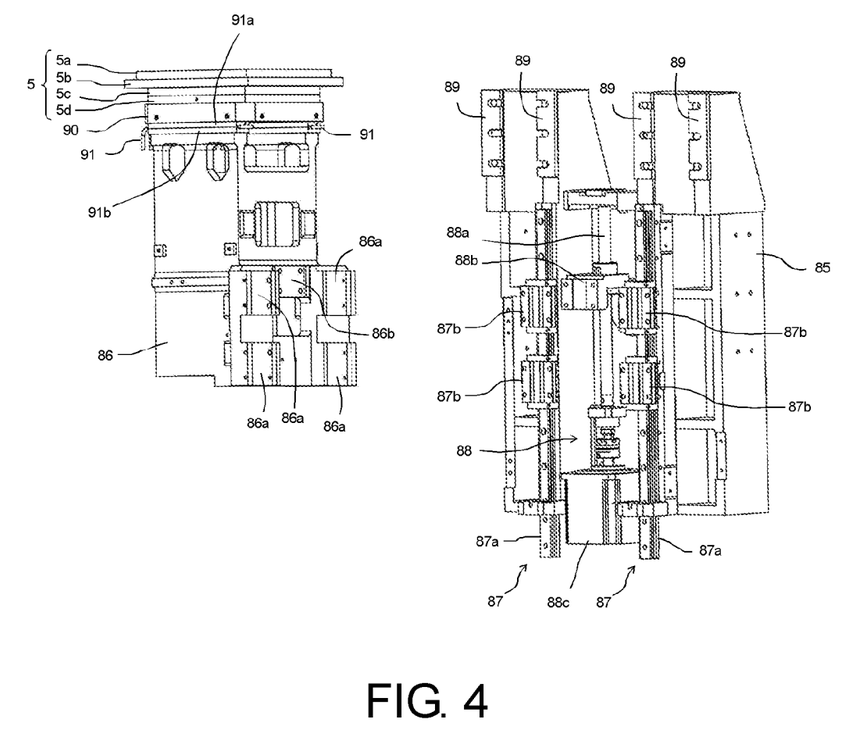
FIG. 4 is a perspective view showing a slide base and a guide base constituting a drive mechanism.

As shown in FIG. 4, the slide mechanism 87 includes a rail 87a and a slide member 87b that is slidably movable along the rail 87a. On the other hand, the screw feed mechanism 88 includes a screw shaft 88a, a nut member 88b engaged with the screw shaft 88a, and a motor 88c that rotates and drives the screw shaft 88a. Four slide members 87b are fixed to mounting portions 86a of the slide base 86. The nut member 88b is fixed to a mounting portion 86b of the slide base 86. Thus, when the nut member 88b is screw-fed and moves in the vertical direction as the motor 88c rotates, the slide base 86 moves in the vertical direction accordingly while being guided by the slide mechanism 87, and as a result, the main table 5 moves in the vertical direction.

The main table 5 includes a top plate 5a and three support plates 5b, 5c, and 5d. A heater capable of heating the top plate 5a is disposed between the top plate 5a and the support plate 5b adjacent to the top plate 5a. During molding, the temperature of the main table 5 is adjusted to about 120 degrees, and a cooler capable of cooling the top plate 5a is disposed between two support plates 5c and 5d below the support plate 5b. Accordingly, the temperature of the main table 5 can be adjusted by the heater and the cooler.

A pair of beam-like mounting portions 86c are provided on the upper portion of the slide base 86. A constant temperature unit 91 whose temperature remains substantially constant is disposed on the mounting portion 86c. The constant temperature unit 91 includes a pipe and a medium with a substantially constant temperature that flows therein. The pipe is interposed and supported between a pair of support plates 91a and 91b. During molding, the constant temperature unit 91 remains at a constant temperature due to circulating water at room temperature in the pipe.

A heat insulating plate 90 is provided between the constant temperature unit 91 and the main table 5. When the heat insulating plate 90 is provided, heat is prevented from being transferred to the constant temperature unit 91 from the main table 5.

In addition, in the embodiment, while an auxiliary table 22 which is a heat source and material powder heated by the auxiliary table 22 and laser emission are isolated and insulated according to a heat source isolation mechanism 20, a molded object is molded. A configuration of the heat source isolation mechanism 20 will be described below in detail with reference to FIG. 5.

Figure 5:
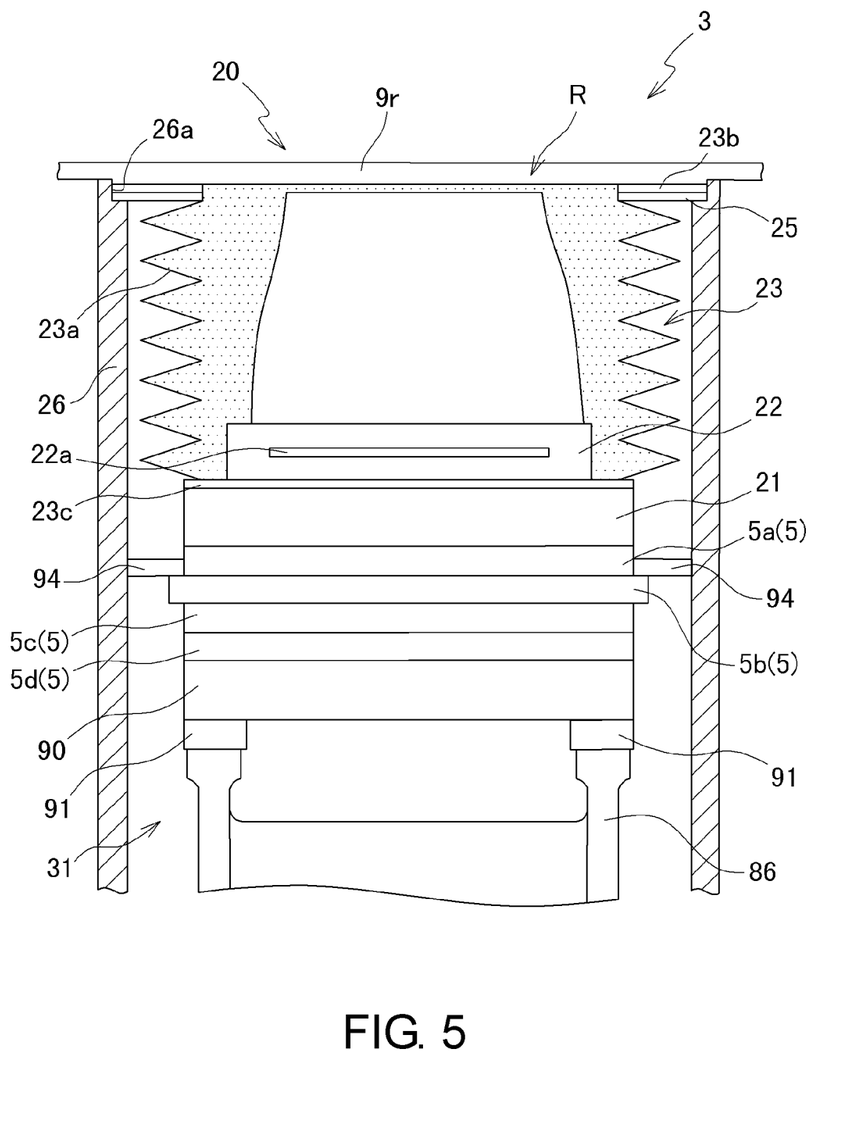
FIG. 5 is an enlarged cross-sectional view around a heat source isolation mechanism.

The heat source isolation mechanism 20 includes the auxiliary table 22, the intermediate table 21 provided immediately below the auxiliary table 22, a bellows member 23 in which the auxiliary table 22 is disposed and which is provided on the side above the upper surface of the intermediate table 21, and a heat insulating member 25 provided between the bellows member 23 and the peripheral wall 26.

The auxiliary table 22 preheats material powder placed in a laser emission area set for each powder layer at a high temperature before a laser beam is emitted. The auxiliary table 22 includes a heater 22a. The heater 22a can adjust the temperature to room temperature or higher. When the molded object is molded, the temperature of the heater 22a is set to a range of 120 degrees to 300 degrees. Here, the temperature of the heater 22a differs depending on properties of material powder which is a material of the molded object. For example, when the material powder is made of stainless steel, the temperature of the heater 22a is set to about 120 degrees, and when the material powder is made of alloy tool steel, the temperature of the heater 22a is set to be in a range of 200 degrees to 300 degrees. Accordingly, when the molded object is molded, the upper surface of the auxiliary table 22 on which the powder material is placed is maintained in a state of being heated to a temperature that is approximately the same as a set temperature of the heater 22a.

The intermediate table 21 prevents heat from being transferred to the main table 5 from the auxiliary table 22. A pipe is provided inside the intermediate table 21. When the molded object is molded, a medium such as water having a temperature range of 80 degrees to 100 degrees constantly circulates in the pipe. Accordingly, when the molded object is molded, the intermediate table 21 is maintained at a certain temperature in the above-described temperature range. According to the temperature range, it is possible to prevent the main table 5 from being heated to the set temperature or higher due to heat of the intermediate table 21, and prevent the auxiliary table 22 from being lowered below the set temperature. The intermediate table 21 is mounted on a tap for mounting the intermediate table 21 provided on the main table 5.

The bellows member 23 isolates and insulates the auxiliary table 22 and material powder supplied onto the auxiliary table 22. The bellows member 23 includes a bellows portion 23a and plate-like parts 23b and 23c provided at both ends of the bellows portion 23a in an expansion and contraction direction. In the plate-like parts 23b and 23c, holes corresponding to edges at both ends of the bellows portion 23a are formed, which have a substantially square shape. The auxiliary table 22 is disposed inside the bellows portion 23a. In the bellows member 23, the plate-like part 23c at the lower end and the intermediate table 21 are screwed and fixed, and the plate-like part 23b at the upper end is fitted to and mounted in an L-shaped groove 26a formed inside the upper end of the peripheral wall 26. Accordingly, the bellows member 23 expands as the slide base 86 is lowered. In addition, when the plate-like part 23b at the upper end is fitted to and mounted in the L-shaped groove 26a of the peripheral wall 26, a space surrounded by the peripheral wall 26 is covered, except a molding area R inside the bellows portion 23a. The bellows member 23 is made of an insulating material.

The heat insulating member 25 prevents heat from being transferred to the peripheral wall 26 from the bellows member 23. The heat insulating member 25 has substantially the same shape as the plate-like part 23b provided at the upper end of the bellows member 23. Similar to the plate-like part 23b, the heat insulating member 25 is fitted to and disposed in the L-shaped groove 26a formed inside the upper end of the peripheral wall 26. The heat insulating member 25 is disposed between the L-shaped groove 26a of the peripheral wall 26 and the plate-like part 23b so that the peripheral wall 26 and the bellows member 23 are physically separated. The heat insulating member 25 is made of an insulating material.

Next, procedures of molding a molded object made of alloy tool steel using the heat source isolation mechanism 20 will be described in detail.

First, a heater built into the main table 5 is operated and heated to about 120 degrees. Further, water at room temperature is circulated in the pipe of the constant temperature unit 91 and the temperature of the constant temperature unit 91 remains constant.

Next, water with a temperature of 80 degrees to 100 degrees is circulated in the pipe in the intermediate table 21, and the temperature of the intermediate table 21 remains constant. Then, the heater 22a built into the auxiliary table 22 is operated such that the upper surface of the auxiliary table 22 is adjusted to, and maintained at 300 degrees.

After the auxiliary table 22 is heated, the recoater head 11 moves in the molding tank 1 in the horizontal uniaxial direction, supplies material powder from a material accommodation unit 11a to the molding area R inside the bellows portion 23a, and flattens the material powder with the blades 11fb and 11rb to form a powder layer on the auxiliary table 22. Then, the laser emission unit 13 emits a laser beam to an emission area set for each powder layer to form a sintered layer. After the sintered layer is formed, the slide base 86 is driven and the auxiliary table 22 is lowered by a degree of the thickness of the powder layer to be formed next. Then, in the same manner as described above, a new powder layer is formed on the sintered layer and a laser beam is emitted to an emission area to form a sintered layer, and these processes are repeated to mold a molded object.

After the molded object is molded, the heater 22a of the auxiliary table 22 is stopped, and the auxiliary table 22 is cooled from 80 degrees to 100 degrees by the intermediate table 21. In addition, when the heater of the main table 5 is stopped and the cooler is operated, the main table 5 is cooled to room temperature.

Operations and Effects

In the embodiment, the heat source isolation mechanism 20 includes the intermediate table 21 mounted on the upper surface of the main table 5, the auxiliary table 22 which is provided on the upper surface of the intermediate table 21 and of which the temperature can be adjusted by the built-in heater 22a, and the bellows member 23 in which the plate-like part 23c at the lower end and the intermediate table 21 are screwed and fixed, the plate-like part 23b at the upper end is fitted to and mounted in the L-shaped groove 26a formed inside the upper end of the peripheral wall 26, and the auxiliary table 22 is disposed inside. The bellows member 23 is made of an insulating material, material powder made of alloy tool steel is supplied to the molding area R inside the bellows member 23 to form a powder layer on the auxiliary table 22, a laser beam is emitted to an emission area set for each powder layer and sintering is performed to mold a molded object. Therefore, due to the intermediate table 21 disposed between the auxiliary table 22 and the main table 5, it is possible to prevent heat from being transferred to the drive mechanism 31 from the auxiliary table 22 heated at a high temperature through the main table 5. In addition, the material powder spread in the molding area R inside the bellows portion 23a is isolated and insulated by the bellows member 23 made of an insulating material. Accordingly, it is possible to prevent heat from being transferred from the material powder heated due to heat of the auxiliary table 22 to the peripheral wall 26 and a peripheral member 94. As described above, it is possible to prevent heat of the auxiliary table 22 from being transferred directly or indirectly to the main table 5, the drive mechanism 31, the peripheral wall 26 and the peripheral member 94. Accordingly, it is possible to mold a molded object by preheating material powder made of alloy tool steel at 300 degrees at a high temperature while preventing thermal deformation of the main table 5, the drive mechanism 31, the peripheral wall 26 and the peripheral member 94.

In addition, the heat insulating member 25 is disposed between the plate-like part 23b and the L-shaped groove 26a of the peripheral wall 26. Accordingly, there is double-insulation by two different members from heat transferred from the heated material powder to the peripheral wall 26.

In addition, the intermediate table 21 is mounted on a tap for mounting the intermediate table 21 provided on the main table 5. In the bellows member 23, the plate-like part 23b at the upper end is fitted to and mounted in the L-shaped groove 26a formed inside the upper end of the peripheral wall 26. Therefore, the heat source isolation mechanism 20 is easily removable. In addition, the temperature of the main table 5 can be adjusted by the heater and the cooler. Therefore, the heat source isolation mechanism 20 may be removed, material powder may be supplied onto the main table 5 to form a powder layer, and a molded object can be molded while preheating the powder layer on the main table 5. Accordingly, for example, in order to preheat material powder at a high temperature, the heat source isolation mechanism 20 is mounted and a molded object is molded on the auxiliary table 22. When a large molded object is molded using a wide space surrounded by the peripheral wall 26, it is possible to appropriately change a molding form according to properties of the molded object to be molded such as by removing the heat source isolation mechanism 20 and molding the molded object on the main table 5. In addition, during molding of a laminate molded object, when the temperature of the main table 5 is controlled such that it has a desired temperature, it is possible to minimize a change in the temperature due to heat transferred from the auxiliary table 22.

In addition, a space surrounded by the peripheral wall 26 is covered and closed, except the molding area R inside the bellows portion 23a. Accordingly, it is possible to prevent heat radiation due to heat of the heated material powder outside of the molding area R.

While exemplary embodiments of the present disclosure have been described above, the present disclosure is not limited to the above-described embodiments and example, and various design modifications within the scope of the appended claims can be made.

While a case in which a molded object is molded on the auxiliary table 22 has been described in the present embodiment, for example, a molding plate made of a thermally conductive material may be provided on the upper surface of the auxiliary table 22 and a molded object may be molded on the molding plate.

In addition, while a case in which the intermediate table 21 is detachably mounted on a tap for mounting the intermediate table 21 provided on the main table 5 has been described, as long as the intermediate table 21 is removable from the main table 5, the intermediate table 21 may be mounted on the main table 5 in any way.

In addition, while a case in which, in the bellows member 23, the plate-like part 23b at the upper end is fitted to and mounted in the L-shaped groove 26a formed inside the upper end of the peripheral wall 26 has been described, as long as the plate-like part 23b is removable from the peripheral wall 26, the plate-like part 23b may be mounted on the peripheral wall 26 in any way.

In addition, while a case in which the heat insulating member 25 is disposed between the L-shaped groove 26a of the peripheral wall 26 and the plate-like part 23b has been described, the heat insulating member 25 may not be provided, the plate-like part 23b may be inserted into the L-shaped groove 26a, and the bellows member 23 in contact with the peripheral wall 26 may be mounted.

In addition, while a case in which a molded object is molded while the main table 5 is heated to about 120 degrees has been described, the heater of the main table 5 may be stopped and the main table 5 may not be heated. In this case, it is not necessary to circulate a medium in the cooler of the main table 5 and the pipe of the constant temperature unit 91.

In addition, even if the bellows member 23 and the heat insulating member 25 are provided, radiant heat of the bellows member 23 and contact heat of the heat insulating member 25 may be transferred to the peripheral wall 26. Therefore, a pipe may be provided in the peripheral wall 26 and the temperature of the peripheral wall 26 may be controlled such that it is within a range of room temperature at which no influence of thermal deformation occurs to 50 degrees. When the temperature of the peripheral wall 26 is controlled such that it has a certain temperature in this manner, it is possible to minimize a change in the temperature due to heat transferred from the plate-like part 23b of the bellows member 23.

In addition, as in the embodiment, when the auxiliary table 22 is heated to a temperature range of 120 degrees to 300 degrees, thermal deformation of the auxiliary table 22 itself increases, the degree of concurrence of the upper surface of the auxiliary table 22 decreases and molding accuracy decreases in some cases. Therefore, when the auxiliary table 22 is heated to the above set temperature so that the degree of concurrence of the upper surface is maintained after thermal deformation is completed, an amount of deformation occurring on the upper surface of the auxiliary table 22 is calculated, and the upper surface of the auxiliary table 22 may be cut in advance. More specifically, for example, a portion that is thermally deformed convexly with respect to a reference height of the upper surface of the auxiliary table 22 may be cut so that it becomes concave by the same amount of deformation. Accordingly, since thermal deformation occurs so that the upper surface of the auxiliary table 22 becomes a flat surface without irregularities after thermal deformation is completed, it is possible to ensure the degree of concurrence of the upper surface of the auxiliary table 22 during molding a molded object heated to a high temperature.

What is claimed is:
1. A laminate molding device comprising:
   a recoater head that reciprocates in a horizontal uniaxial direction, which supplies and flattens a metal material powder to form a powder layer;
   a laser emission unit configured to emit a laser beam to an emission area of the powder layer to form a sintered layer;
   a main table;
   a peripheral wall that is provided to surround the main table;
   a space that is surrounded by the peripheral wall;
   a drive mechanism that is connected to the main table and increases a volume of the space by lowering the main table; and a heat source isolation mechanism that is disposed on the main table, wherein the heat source isolation mechanism comprises:

an intermediate table that is mounted on an upper surface of the main table;

an auxiliary table which is provided on an upper surface of the intermediate table and of which a temperature can be adjusted; and a bellows member in which the auxiliary table is disposed and which comprises a lower end that is provided on the intermediate table and an upper end that is mounted on the peripheral wall, and which expands as the main table is lowered, wherein the bellows member is made of an insulating material, and wherein the recoater head supplies the metal material powder to a molding area inside the bellows member and the powder layer is formed on the auxiliary table, the laser emission unit emits a laser beam to a predetermined area of the powder layer and sintering is performed, and thus a molded object is molded.

2. The laminate molding device according to claim 1, wherein, when a molded object is molded, the temperature of the auxiliary table is adjusted to be in a range of 120 degrees or more and 300 degrees or less.

3. The laminate molding device according to claim 1, wherein the heat source isolation mechanism further comprises a heat insulating member, and wherein the heat insulating member is disposed between the bellows member and the peripheral wall.

4. The laminate molding device according to claim 1, wherein a temperature of the peripheral wall can be adjusted.

5. The laminate molding device according to claim 1, further comprising a cooling unit provided on a lower surface of the main table, wherein the intermediate table is detachably mounted on the main table, wherein the bellows member is detachably mounted on the peripheral wall, wherein a temperature of the main table can be adjusted, and wherein, when the heat source isolation mechanism is removed, the recoater head supplies the metal material powder to the molding area inside the bellows member to form the powder layer on the main table, the laser emission unit emits the laser beam to the predetermined area of the powder layer and sintering is performed, and thus the molded object is molded.

\* \* \* \* \*